US006542895B1

(12) United States Patent
DeKimpe et al.

(10) Patent No.: US 6,542,895 B1
(45) Date of Patent: Apr. 1, 2003

(54) MULTI-DIMENSIONAL RESTRUCTURE PERFORMANCE WHEN ADDING OR REMOVING DIMENSIONS AND DIMENSIONS MEMBERS

(75) Inventors: Daniel Martin DeKimpe, La Selva Beach, CA (US); William Earl Malloy, Santa Clara, CA (US); Khiem Phu Pham, San Jose, CA (US); Craig Reginald Tomlyn, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/386,072

(22) Filed: Aug. 30, 1999

(51) Int. Cl.[7] .............................................. G06F 17/30
(52) U.S. Cl. ....................................................... 707/101
(58) Field of Search .......................... 707/1, 2, 3, 100, 707/101

(56) References Cited

U.S. PATENT DOCUMENTS 5,359,724 A * 10/1994 Earle ........................... 707/205
5,721,910 A * 2/1998 Unger et al. ................. 707/100
5,845,270 A * 12/1998 Schatz et al. .................. 706/11
5,864,857 A * 1/1999 Ohata et al. .................. 707/100
5,878,426 A * 3/1999 Plasek et al. ................. 707/102
5,905,985 A * 5/1999 Malloy et al. ............... 707/100
6,182,060 B1 * 1/2001 Hedgcock et al. ............. 707/1
6,199,063 B1 * 3/2001 Colby et al. ................... 707/4
6,317,750 B1 * 11/2001 Tortolani et al. ........... 707/103

* cited by examiner

*Primary Examiner*—John Breene
*Assistant Examiner*—Cheryl Lewis
(74) *Attorney, Agent, or Firm*—Fay, Sharpe, Fagan, Minnich & McKee, LLP

(57) ABSTRACT

A method, apparatus, and article of manufacture for improving multi-dimensional restructure performance when adding or removing dimensions and dimension members. A command is executed in a computer to perform a database operation on a relational database stored on a data store connected to the computer. It is determined that a multi-dimensional database has been modified. Then, it is determined that the modified multi-dimensional database requires modifications to one or more original tables in a relational database corresponding to the multi-dimensional database. The modifications are incorporated into one or more new tables by copying data from the original tables into the new tables.

45 Claims, 11 Drawing Sheets

MULTI-DIMENSIONAL RESTRUCTURE PERFORMANCE WHEN ADDING OR REMOVING DIMENSIONS AND DIMENSIONS MEMBERS

CROSS-REFERENCE TO RELATED APPLICATIONS

This application is related to the following co-pending and commonly-assigned patent applications:

Application Ser. No. 09/385,017, entitled "IMPROVING MULTI-DIMENSIONAL RESTRUCTURE PERFORMANCE BY SELECTING A TECHNIQUE TO MODIFY A RELATIONAL DATABASE BASED ON A TYPE OF RESTRUCTURE," filed on same date herewith, by Daniel M. DeKimpe et al. pending;

Application Ser. No. 09/356,647, entitled "IMPROVING PERFORMANCE OF TABLE INSERTION BY USING MULTIPLE TABLES OR MULTIPLE THREADS," filed on Jul. 19, 1999, by Daniel M. DeKimpe et al. pending;

Application Ser. No. 09/356,471, entitled "EXTENSION OF DATA DEFINITION LANGUAGE (DDL) CAPABILITIES FOR RELATIONAL DATABASES FOR APPLICATIONS ISSUING DDL STATEMENTS," filed on Jul. 19, 1999, by Daniel M. DeKimpe et al. U.S. Pat. No. 6,421,677;

Application Ser. No. 09/356,059, entitled "EXTENSION OF DATA DEFINITION LANGUAGE (DDL) CAPABILITIES FOR RELATIONAL DATABASES FOR APPLICATIONS ISSUING DDL AND DML STATEMENTS," filed on Jul. 19, 1999, by Daniel M. DeKimpe et al. U.S. Pat. No. 6,480,848; and Application Ser. No. 09/356,644, entitled "EXTENSION OF DATA DEFINITION LANGUAGE (DDL) CAPABILITIES FOR RELATIONAL DATABASES FOR APPLICATIONS ISSUING MULTIPLE UNITS OF WORK," filed on Jul. 19, 1999, by Daniel M DeKimpe et al. U.S. Pat. No. 6,453,322;

which are incorporated by reference herein.

BACKGROUND OF THE INVENTION

1. Field of the Invention

This invention relates in general to database management systems performed by computers, and in particular, to improving multi-dimensional restructure performance when adding or removing dimensions and dimension members.

2. Description of Related Art

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

RDBMS software has typically been used with databases comprised of traditional data types that are easily structured into tables. However, RDBMS products do have limitations with respect to providing users with specific views of data. Thus, "front-ends" have been developed for RDBMS products so that data retrieved from the RDBMS can be aggregated, summarized, consolidated, summed, viewed, and analyzed. However, even these "front-ends" do not easily provide the ability to consolidate, view, and analyze data in the manner of "multi-dimensional data analysis." This type of functionality is also known as on-line analytical processing (OLAP).

OLAP generally comprises numerous, speculative "what-if" and/or "why" data model scenarios executed by a computer. Within these scenarios, the values of key variables or parameters are changed, often repeatedly, to reflect potential variances in measured data. Additional data is then synthesized through animation of the data model. This often includes the consolidation of projected and actual data according to more than one consolidation path or dimension.

Data consolidation is the process of synthesizing data into essential knowledge. The highest level in a data consolidation path is referred to as that data's dimension. A given data dimension represents a specific perspective of the data included in its associated consolidation path. There are typically a number of different dimensions from which a given pool of data can be analyzed. This plural perspective, or Multi-Dimensional Conceptual View, appears to be the way most business persons naturally view their enterprise. Each of these perspectives is considered to be a complementary data dimension. Simultaneous analysis of multiple data dimensions is referred to as multi-dimensional data analysis.

OLAP functionality is characterized by dynamic multi-dimensional analysis of consolidated data supporting end user analytical and navigational activities including:

calculations and modeling applied across dimensions, through hierarchies and/or across members;

trend analysis over sequential time periods;

slicing subsets for on-screen viewing;

drill-down to deeper levels of consolidation;

reach-through to underlying detail data; and rotation to new dimensional comparisons in the viewing area.

OLAP is often implemented in a multi-user client/server mode and attempts to offer consistently rapid response to database access, regardless of database size and complexity. While some vendors have proposed and offered OLAP systems that use RDBMS products as storage managers, to date these offerings have been unsuccessful for a variety of reasons.

A multi-dimensional OLAP system has multiple dimensions and members within the dimensions. The data for these dimensions and members may be stored in a table. Then, if these dimensions are changed, data in the table is modified. In particular, a large numbers of rows may be deleted (i.e., removed) from a relational database table in a single unit of work. Deleting a large number of rows may lead to several problems. First, performance may be slow because of the volume of data being deleted and because the database manager logs all these changes. Second, the database manager may run out of log space. That is, some database managers have an upper limit to the size of the transaction log file. If enough rows are deleted this maximum log file size will be reached.

Thus, there is a need in the art for improving multi-dimensional restructure performance when adding or removing dimensions and dimension members.

SUMMARY OF THE INVENTION

To overcome the limitations in the prior art described above, and to overcome other limitations that will become apparent upon reading and understanding the present specification, the present invention discloses a method, apparatus, and article of manufacture for improving multidimensional restructure performance when adding or removing dimensions and dimension members.

According to an embodiment of the invention, a command is executed in a computer to perform a database operation on a relational database stored on a data store connected to the computer. It is determined that a multi-dimensional database has been modified. Then, it is determined that the modified multi-dimensional database requires modifications to one or more original tables in a relational database corresponding to the multi-dimensional database. The modifications are incorporated into one or more new tables by copying data from the original tables into the new tables.

BRIEF DESCRIPTION OF THE DRAWINGS

Referring now to the drawings in which like reference numbers represent corresponding parts throughout.

DETAILED DESCRIPTION OF A PREFERRED EMBODIMENT

Figure 1:
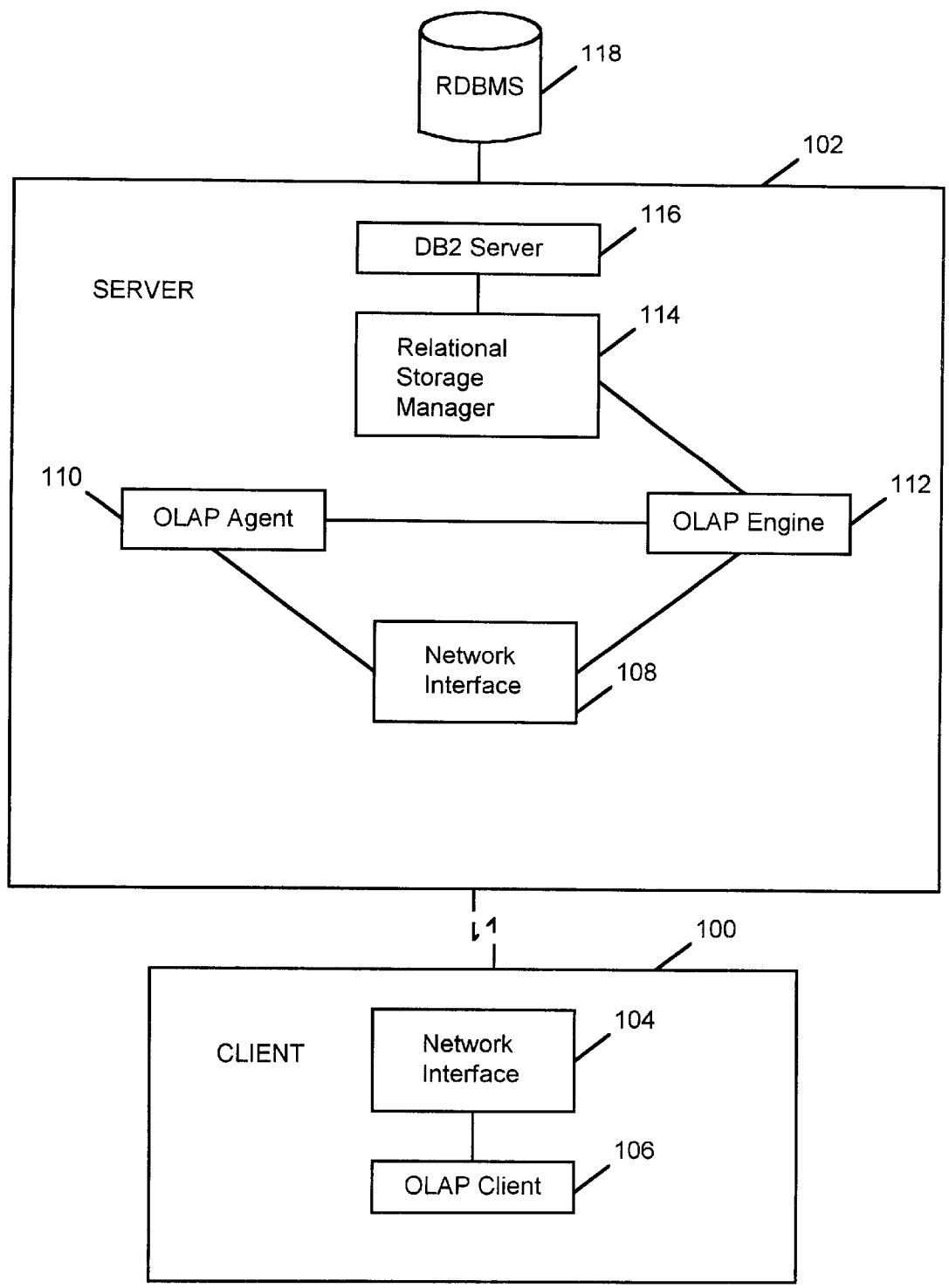
FIG. 1 is a block diagram illustrating a hardware environment used to implement a preferred embodiment of the present invention.

In the following description of a preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises an OLAP system that is designed for a wide-range of multi-dimensional reporting and analysis applications. The OLAP system is based both on Hyperion Software's Essbase OLAP software and IBM's DB2 RDBMS software. The present invention utilizes a number of components from Hyperion Software's Essbase OLAP system, including components that provide data access, navigation, application design and management and data calculation. However, the present invention comprises new elements that perform database operations, such as storing and retrieving data, for the OLAP system in a relational database. The present invention replaces the integrated multi-dimensional data storage manager of Hyperion Software's Essbase OLAP software with a relational storage manager based on IBM's DB2 RDBMS software. The relational storage manager enables the OLAP system to store data directly into a relational database.

The relational database utilized by the present invention provides the capacity of industry leading relational databases, and can be managed by familiar RDBMS systems management, backup, and recovery tools. It also offers the advantage of providing access to data using standard SQL (Structured Query Language). In addition, the present invention is designed for applications with very large data volumes. Further, the present invention leverages the existing RDBMS skills of information technology professionals.

The present invention differs from prior art ROLAP (Relational-OLAP) products in significant ways. Prior art ROLAP products, for example, are unsuited for applications which require complex calculations, read/write support, or high numbers of concurrent users. In addition, prior art ROLAP products require extensive support staffs or consultants to develop and deploy applications.

The present invention does not share any of these limitations. Because it integrates Hyperion Software's Essbase OLAP software with IBM's DB2 RDBMS software, the present invention provides simplified application design, robust calculation capabilities, and flexible data access coupled with scalability of user access. Significant advantages of the present invention over ROLAP include: performance; automatic table, index and summary management; robust analytical calculations; multi-user read and write access; and security.

With regard to performance, the present invention is designed to deliver consistent, fast response measured in seconds regardless of database size. Prior art ROLAP products measure response time in tens of seconds, minutes or hours.

With regard to automatic table, index and summary management, the present invention automatically creates and manages tables and indices within a star schema in the relational database. The present invention can also populate the star schema with calculated data. Prior art ROLAP products require teams of database architects to manage hundreds or thousands of summary tables manually in order to deliver acceptable end-user performance.

With regard to robust analytical calculations, the present invention is designed to perform high-speed data aggregations (revenue by week, month, quarter and year), matrix calculations (percentages of totals), cross-dimensional calculations (market share and product share) and procedural calculations (allocations, forecasting). Prior art ROLAP products provide less robust calculation capabilities.

With regard to multi-user read and write access, the present invention is designed to support multi-user read and write access which enables operational OLAP applications such as budgeting, planning, forecasting, modeling, "what-ifing" etc. On the other hand, prior art ROLAP products are read-only.

With regard to security, the present invention is designed to deliver robust data security down to the individual data cell level. Prior art ROLAP products provide no security, or only limited application level security.

The capabilities of the present invention are the same as those of Hyperion Software's Essbase OLAP software, including sophisticated OLAP calculations, comprehensive OLAP navigation features, complex database access support and multi-user read/write functionality. In addition, front-end tools, system management tools and applications from Hyperion Software and leading third parties will also work with the present invention. Consulting and education companies that have developed expertise with Hyperion Software's Essbase OLAP software can immediately apply their experience and knowledge to the present invention.

Although the present specification describes the use of IBM's DB2 RDBMS software, those skilled in the art will recognize that the present invention can use DB2, Oracle, Informix, Sybase, or other RDBMS software, and can run on computers using IBM OS/2, Microsoft Windows NT, IBM-AIX, Hewlett-Packard HP-UX, Sun Solaris, and other operating systems.

Hardware Environment

FIG. 1 is a block diagram illustrating a hardware environment used to implement the preferred embodiment of the present invention. In the hardware environment, a client/server architecture is illustrated comprising an OLAP client computer 100 coupled to an OLAP server computer 102. In the hardware environment, the OLAP client 100 and OLAP server 102 may each include, inter alia, a processor, memory, keyboard, or display, and may be connected locally or remotely to fixed and/or removable data storage devices and/or data communications devices. Each of the computers 100 and 102 also could be connected to other computer systems via the data communications devices. Those skilled in the art will recognize that any combination of the above components, or any number of different components, peripherals, and other devices, may be used with the computers 100 and 102. Those skilled in the art will also recognize that the present invention may be implemented on a single computer, rather than multiple computers networked together.

The present invention is typically implemented using one or more computer programs, each of which executes under the control of an operating system, such as OS/2, Windows, DOS, AIX, UNIX, MVS, etc., and causes the computers 100 and 102 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the computers 100 and 102, cause the computers 100 and 102 to perform the steps necessary to implement and/or use the present invention. Under control of the operating system, the computer programs may be loaded from the memory, data storage devices, and/or data communications devices into the memories of the computers 100 and 102 for use during actual operations. Those skilled in the art will recognize many modifications may be made to this configuration without departing from the scope of the present invention.

In the example illustrated in FIG. 1, the present invention includes a network interface program 104 and an OLAP client program 106 executed by the OLAP client 100, and a network interface program 108, an OLAP agent program 110, an OLAP engine program 112, a relational storage manager (RSM) program 114, and a DB2 server program 116 executed by the OLAP server 102. The DB2 server program 116, in turn, performs various database operations, including search and retrieval operations, termed queries, insert operations, update operations, and delete operations, against one or more relational databases 118 stored on a remote or local data storage device.

The present invention utilizes a number of components from Hyperion Software's Essbase OLAP system, including the network interface 104, OLAP client 106, network interface 108, OLAP agent 110, and OLAP engine 112. These components provide data access, navigation, application design and management and data calculation. However, the relational storage manager 114 and DB2 server 116 comprise new elements that access (e.g., store and retrieve) data for the OLAP system in a relational database.

Those skilled in the art will recognize that the hardware environment illustrated in FIG. 1 is not intended to limit the present invention. Indeed, those skilled in the art will recognize that other alternative hardware environments may be used without departing from the scope of the present invention.

Conceptual Structure of the Multi-Dimensional Database

Figure 2:
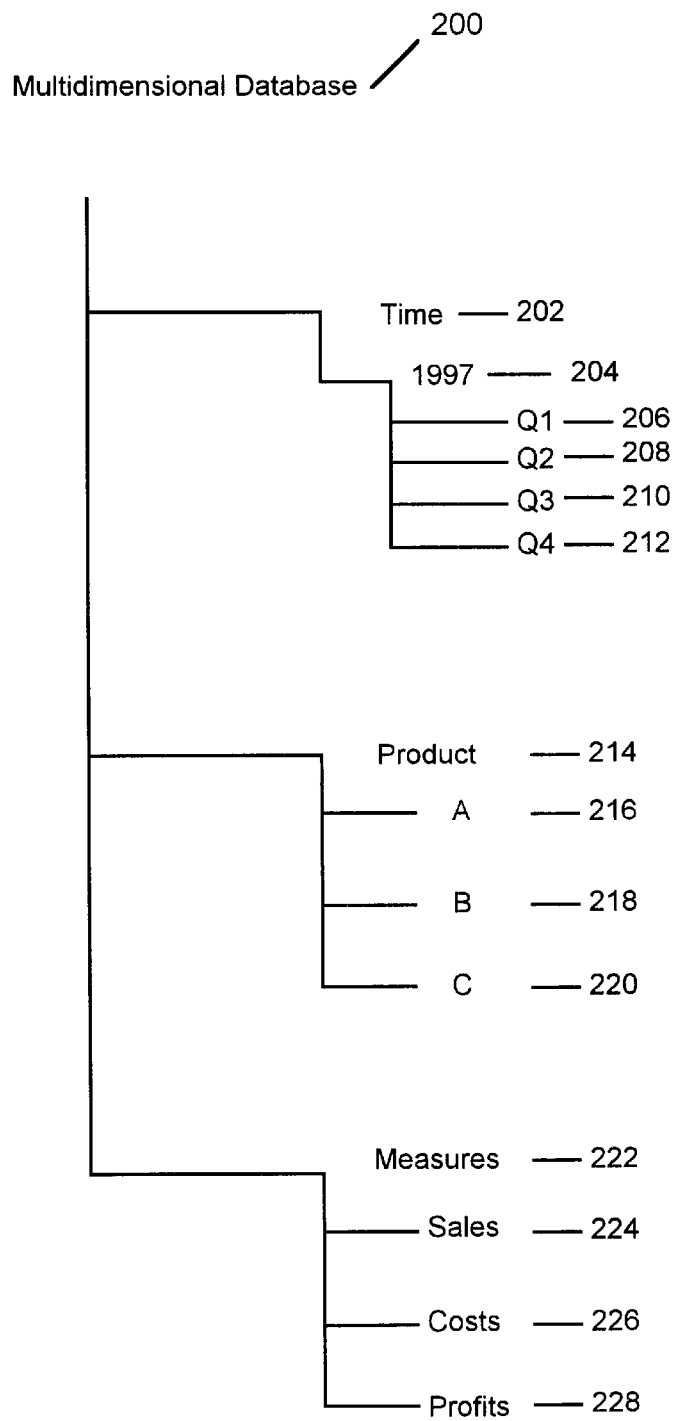
FIG. 2 is a diagram that illustrates the conceptual structure (i.e., an outline) of a multi-dimensional database according to the present invention.

FIG. 2 is a diagram that illustrates the conceptual structure (i.e., an outline) of a multi-dimensional database 200 according to the present invention. A dimension 202, 214, or 222 is a structural attribute that is a list of members, all of which are of a similar type in the user's perception of the data. For example, the year 1997 204 and all quarters, Q1 206, Q2 208, Q3 210, and Q4 212, are members of the Time dimension 202. Moreover, each dimension 202, 214, or 222 is itself considered a member of the multi-dimensional database 200.

Logical Structure of the Multi-Dimensional Database

Figure 3:
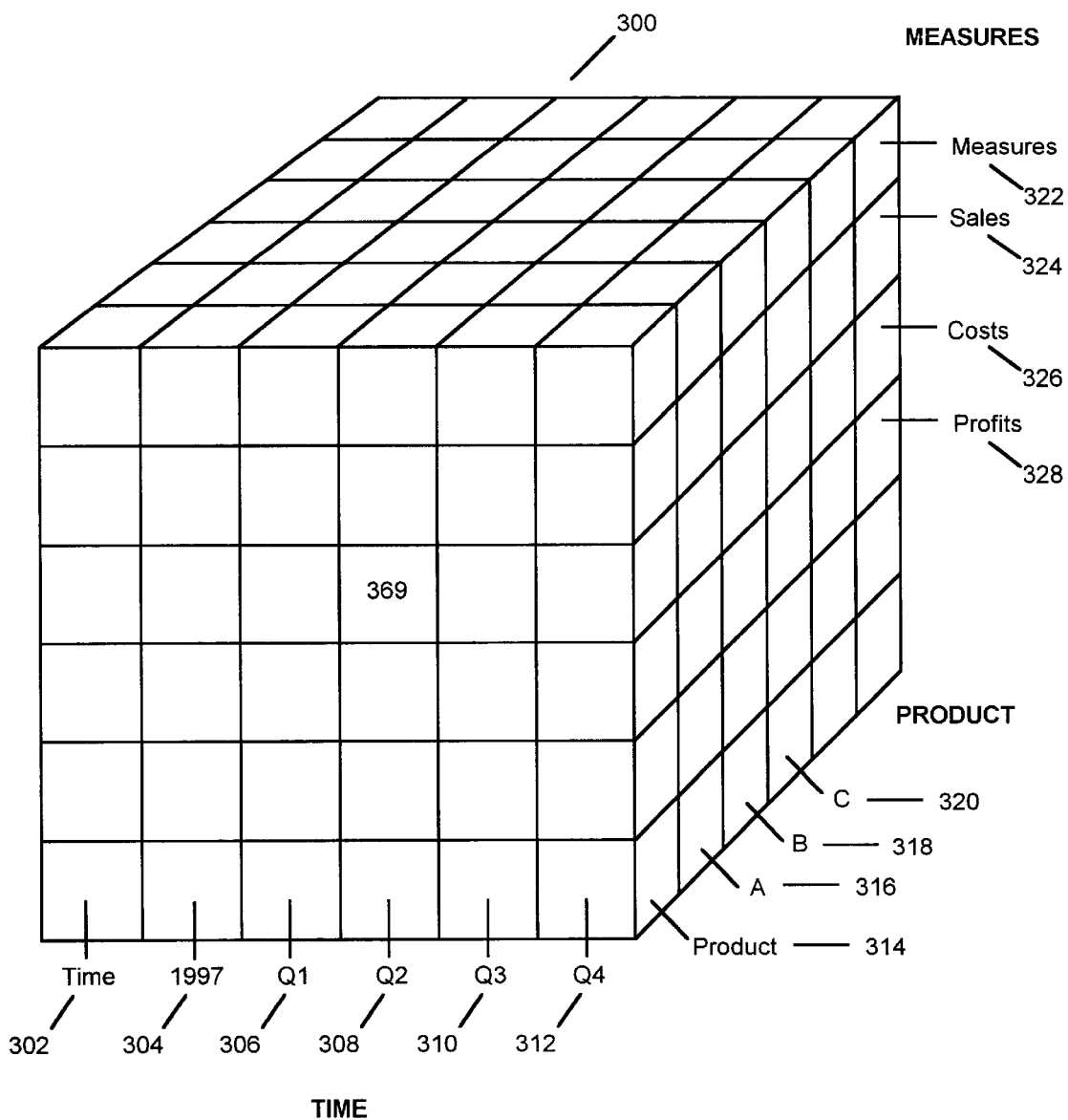
FIG. 3 is a diagram that illustrates the logical structure of a multi-dimensional database according to the present invention.

FIG. 3 is a diagram that illustrates the logical structure of a multi-dimensional database 300 according to the present invention. Generally, the multi-dimensional database 300 is arranged as a multi-dimensional array, so that every data item is located and accessed based on the intersection of the members which define that item. The array comprises a group of data cells arranged by the dimensions of the data. For example, a spreadsheet exemplifies a two-dimensional array with the data cells arranged in rows and columns, each being a dimension. A three-dimensional array can be visualized as a cube with each dimension forming an edge. Higher dimensional arrays (also known as Cubes or Hypercubes) have no physical metaphor, but they organize the data in a way desired by the users.

A dimension acts as an index for identifying values within the Cube. If one member of the dimension is selected, then the remaining dimensions in which a range of members (or all members) are selected defines a sub-cube in which the number of dimensions is reduced by one. If all but two dimensions have a single member selected, the remaining two dimensions define a spreadsheet (or a "slice" or a "page"). If all dimensions have a single member selected, then a single cell is defined. Dimensions offer a very concise, intuitive way of organizing and selecting data for retrieval, exploration and analysis.

A single data point or cell occurs at the intersection defined by selecting one member from each dimension in a cube. In the example cube shown in FIG. 3, the dimensions are Time, Product, and Measures. The cube is three dimensional, with each dimension (i.e., Time, Product, and Measures) represented by an axis of the cube. The intersection of the dimension members (i.e., Time 302, 1997 304, Q1 306, Q2 308, Q3 310, Q4 312, Product 314, A 316, B 318, C 320, Measures 322, Sales 324, Costs 326, and Profits 328) are represented by cells in the multi-dimensional database that specify a precise intersection along all dimensions that uniquely identifies a single data point. For example, the intersection of Q2 308, Product 314 and Costs 326 contains the value, 369, representing the costs of all products in the second quarter of 1997.

Cubes generally have hierarchies or formula-based relationships of data within each dimension. Consolidation involves computing all of these data relationships for one or more dimensions. An example of consolidation is adding up all sales in the first quarter. While such relationships are normally summations, any type of computational relationship or formula might be defined.

Members of a dimension are included in a calculation to produce a consolidated total for a parent member. Children may themselves be consolidated levels, which requires that they have children. A member may be a child for more than one parent, and a child's multiple parents may not necessarily be at the same hierarchical level, thereby allowing complex, multiple hierarchical aggregations within any dimension.

Drilling down or up is a specific analytical technique whereby the user navigates among levels of data ranging from the most summarized (up) to the most detailed (down). The drilling paths may be defined by the hierarchies within dimensions or other relationships that may be dynamic within or between dimensions. For example, when viewing data for Sales 324 for the year 1997 304 in FIG. 3, a drill-down operation in the Time dimension 302 would then display members Q1 306, Q2 308, Q3 310, and Q4 312.

Relational Database Structure

Figure 4:
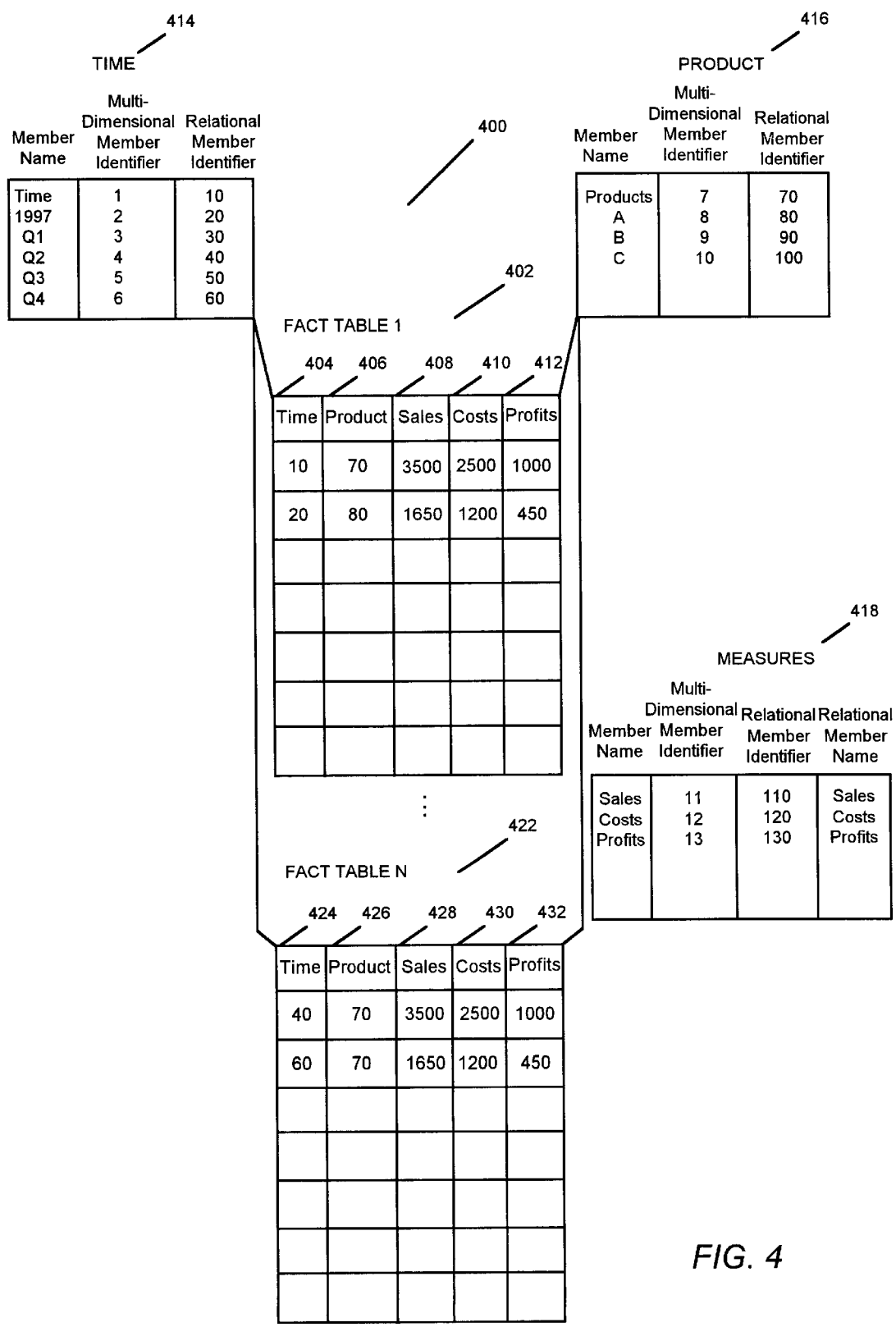
FIG. 4 is a diagram that illustrates a structure for storing multi-dimensional data in a relational database structure according to the present invention.

FIG. 4 is a diagram that illustrates a structure for storing multi-dimensional data in a relational database structure according to the present invention. The present invention stores data in a star schema 400 in the relational database 118, as opposed to a specialized multi-dimensional data store as described in the U.S. Pat. No. 5,359,724 patent. However, in order to work correctly with Hyperion Software's Essbase OLAP software, the relational storage manager 114 and DB2 server 116 of the present invention work together to emulate the structure and functions performed in the U.S. Pat. No. 5,359,724 patent, even though a different database is used to store the multi-dimensional data.

In the present invention, the multi-dimensional data is stored in a star schema 400 in the relational database 118. A star schema 400 is a set of relational tables including multiple main tables 402 through 422 and related dimension tables 414, 416, and 418, wherein the dimension tables 414 and 416 intersect the main tables 402 through 422 via common columns, and wherein the dimension table 418 has a column in the main tables 402 through 422 corresponding to each of its rows. The preferred embodiment of the present invention provides a view of multiple partitions as a single table. In particular, the term "partition" as used herein does not necessarily refer to partitions as defined by a standard relational database system, but, instead, refers to the partitioning of data across individual main tables as used by the preferred embodiment of the present invention. A star schema 400 has several benefits over storing information in traditional RDBMS tables used for on-line transaction processing (OLTP).

Because a star schema 400 is simple, having few tables, it minimizes the complexity required to process database operations. This helps both to speed performance and to ensure correct results of database operations.

Moreover, the use of a star schema 400 is a well known, standard model, and many relational databases 118 have built in optimization for it. By adhering to this standard model, the present invention automatically takes advantage of any such optimization.

In the example of FIG. 4, the boxes and ellipses represent fact tables 402 through 422 and dimension tables 414, 416, and 418. The connections between the boxes 402 through 422 and 414 and 416 represent star joins between tables. The fact tables 402 through 422 are also known as fact tables. The star schema 400 thus comprises fact tables 402 through 422, which are joined to one or more dimension tables, TIME 414 and PRODUCT 416, according to specified relational or conditional operations. The fact tables 402 through 422 hold data values, while the dimension tables TIME 414, PRODUCT 416, and MEASURES 418 hold member information. As a result, the dimension tables 414, 416, and 418 are relatively small, and the fact tables 402 through 422 are usually very large.

The dimension tables TIME 414 and PRODUCT 416 are usually joined to the fact tables 402 through 422 with an equivalence condition. In this example of a star schema 400, there are no join conditions between the dimension tables TIME 414, PRODUCT 416, and MEASURES 418 themselves.

In the preferred embodiment, one dimension, called an "Anchor" dimension, is treated differently from the other dimensions, called "non-anchor" dimensions, in that all of its members are mapped to columns in the fact tables 402 through 422. For example, in FIG. 4, the MEASURES dimension 418 is the anchor dimension. There is one column in each fact table 402 through 422 (i.e., SALES 408 and 428, COSTS 410 and 430, and PROFITS 412 and 432) for each member, Sales, Costs, and Profits, of the MEASURES dimension 418. The fact tables 402 through 422 also contain one column, TIME 404 and 424 and PRODUCT 406 and 426, for each other non-anchor dimension, TIME 414 and PRODUCT 416.

Although there are multiple fact tables illustrated in FIG. 4, one skilled in the art would recognize that the techniques of the present invention may also be applied to a single fact table.

Fact Table

In the preferred embodiment of the present invention, there are N fact tables for each Cube (e.g., FACT TABLE-1 and FACT TABLE-N, along with the ellipses in FIG. 4, illustrate multiple fact tables). The fact tables hold the actual data values of the Cube. In particular, each fact table holds a data block, which is a portion of the Cube. The fact tables 402 through 422 have a dimension column corresponding to each non-anchor dimension table 414 and 416. The dimension columns of the fact tables 402 through 422 hold relational member identifiers, and the non-anchor dimension tables 414 and 416 hold the mapping between those relational member identifiers and the member names and multi-dimensional member identifiers. The data values in the fact tables 402 through 422 are indexed by the relational member identifiers from each of the dimension columns.

For example, one row in the fact table 402 contains all data values for a unique combination of members from the different non-anchor dimension tables 414 and 416. Specifically, the dimension columns 404 and 406 contain relational member identifiers corresponding to the multi-dimensional member identifiers, and the member columns 408, 410, and 412 contain data values. For example, the first row in the example of FIG. 4, holds the Sales of 3500, Costs of 2500, and Profits of 1000 for every Product and all Times. Moreover, the second row, in the example of FIG. 4, holds the Sales of 1650, Costs of 1200, and Profits of 450 for Product A during the 1997 Time frame.

The fact tables 402 through 422 only hold rows for valid combinations of members from the non-anchor dimensions. So, for example, if a particular product is not sold in a year, there will be no sales, costs or profit figures for any time period for that product in that year. Consequently, the fact tables 402 through 422 would not hold any rows for these combinations.

Dimension Tables

As described above, there is one dimension table for each dimension defined in the Cube (i.e., based on the outline). The purpose of the dimension tables is to hold all information relevant to the members of a particular dimension.

Each dimension table contains one row for each member defined in the associated dimension. Note that the dimension name itself is considered to be a member since it represents the top level of the hierarchy for that dimension. The columns are as follows:

MemberName—This is the member name. It is the user-entered name for each member. The value of the MemberName is set to a NULL value if this member is deleted. When a RelMemberId is required, the RelMemberId corresponding to a MemberName which is a NULL value is reused.

RelMemberName—This is the relational member name. It is only used in the Anchor dimension table (because the members from this dimension map to columns in the fact table 402). This column therefore needs to contain valid relational column names. Therefore, this column may contain member names which have been modified from those stored in MemberName, if necessary.

RelMemberId—This is the relational member identifier. This contains an identifying number for each member used to access data in the relational database. This number is unique within the dimension table. This column is used to 'join' the dimension table to the fact table. Members always retain the same relational member identifier throughout their life time. A relational member identifier may be reused if a member is deleted and another member is created.

MemberId—This is the multi-dimensional member identifier. This contains an identifying number allocated to the member by Essbase. When a Cube definition is altered in Essbase and the Essbase database is restructured, this value may be changed by Essbase. This is a NULL value if MemberName is a NULL value.

The MemberName is typically obtained from the outline. The MemberId is assigned by Hyperion Software's Essbase OLAP software and is used by this software to access multi-dimensional data stored in dense data blocks in a multi-dimensional database 300. The RelMemberId is the common column between the non-anchor dimension tables 414 and 416 and the fact tables 402 through 422 that is used to join the tables 402, 414, and 416 and 422,414, and 416 and is used to access data in the relational database 118 (i.e., fact table 402). The MemberId, which is used internally by Hyperion Software's Essbase OLAP software, maps to the RelMemberId, which is used by the relational database 118 to access data.

Accessing Multi-Dimensional Data

To access the multi-dimensional data in the relational database 118, a user interacts with the OLAP client program 106 executed by the OLAP client 100. This interaction results in a request (i.e., command) for a database operation being formed, which is transmitted to the OLAP agent 110 and/or OLAP engine 112 executed by the OLAP server 102 via the network interface programs 104 and 108. The OLAP agent 110 communicates with the OLAP engine 112, and the OLAP engine 112 executes functions via the relational storage manager 114 to access the multi-dimensional data from a data storage manager. In Hyperion Software's Essbase OLAP software, data is requested by specifying one or more sparse index keys (i.e., a sparse index key is an encoding of one member from each sparse dimension) that identify one or more dense data blocks in the multi-dimensional database 300.

In the present invention, these sparse index keys comprise combinations of one MemberId for each sparse dimension used internally in Hyperion Software's Essbase OLAP software. The relational storage manager 114 requests the OLAP Engine 112 to decompose the sparse index key into a list of MemberIds. The relational storage manager 114 maps the MemberIds to the RelMemberIds used in the relational database 118 via the respective non-anchor dimension tables 414 and 416 in the relational database 118. Then, the RelMemberIds are used to access the respective non-anchor dimension tables 414 and 416 in the relational database 118. The resulting rows of the non-anchor dimension tables 414 and 416 are joined to corresponding rows in the fact tables 402 through 422.

As mentioned above, each fact table contains multiple data blocks. When the OLAP client program 106 submits, via the OLAP agent 110 and OLAP engine 112, a request to the relational database, the OLAP client program 106 reads or writes data from a single data block. Therefore, when the relational storage manager 114 maps MemberIds to RelMemberIds, the relational storage manager 114 also determines which one of the fact tables 402 through 422 contains the data corresponding to the data block to be accessed. Thus, only one of the fact tables 402 through 422 is accessed to respond to a request. The rows of the selected fact table 402 through 422, which thus meet the criteria of the sparse index keys, are returned by the DB2 server 116 to the relational storage manager 114.

The rows returned have RelMemberIds followed by values for each of the members of the anchor dimension (e.g., the MEASURES dimension 418 in FIG. 4). The relational storage manager 114 then converts the RelMemberIds into MemberIds and reformats the rows from the fact table 402 into a "dense data block". The reformatted rows are passed to the OLAP engine 112, which ultimately return the desired data to the OLAP client 106.

Another advantage of the embodiment of the invention is that the relational storage manager 114 defines a view of the fact tables as a single fact table. A user can write a customized application (i.e., a customer written application) to select information from the view. Thus, the customized application is not aware that the data has been partitioned among several tables. That is, to shield customized applications from this partitioning of the data, the relational storage manager 114 creates a view of the partitioned fact tables (i.e., UNIONed SELECTs) that appears to be and acts identically to a single fact table when queried (i.e., with SELECTs) Additionally, the customized application communicates directly with the DB2 Server 116 and does not need to communicate with the relational storage manager 114. To provide this view, the relational storage manager 114 SELECTS all of the rows from each of the fact tables and combines the rows using a UNION operation to form a view comprising a single fact table. Thus, the use of multiple fact tables is transparent.

In this manner, the relational database 118 can be used to emulate multi-dimensional data in a multi-dimensional database 300. Moreover, by converting between MemberIds of the sparse index keys and RelMemberIds, the DB2 server 116 is able to treat the data in the relational database 118 as dense data blocks for Hyperion Software's Essbase OLAP software, while actually maintaining the data in a relational database 118.

In an alternative embodiment, the MemberIds and the RelMemberIds are mapped to each other using two in-memory arrays. The array used to map MemberIds to RelMemberIds has an element for each MemberId containing the corresponding RelMemberId. The array used to map RelMemberIds to MemberIds has an element for each RelMemberId containing the corresponding MemberId. These arrays are generated after the outline is created, and they are re-constructed each time the relational storage manager 114 initializes or "opens" the multi-dimensional database and after each outline re-structure.

In Hyperion Software's Essbase model of a multi-dimensional database, the dense data blocks of the multi-dimensional database are ordered by the numerical values of their sparse index keys. In the present invention, the relational storage manager 114 maintains the ordering of the dense data blocks by storing the sparse index keys in a key table. The relational storage manager 114 holds also holds additional information about each dense data block in the key table. In particular, the information includes status information (e.g., usage information) and timestamps (e.g., age information).

Outline Modifications

When the outline is modified, the relational database 118 is modified. In particular, when an outline is changed, Hyperion Software's Essbase OLAP software may change the MemberIds for members defined in the outline. When this happens, the MemberIds in the dimension tables 414, 416, and 418 are updated accordingly. When a member is deleted from the outline, the corresponding row of the dimension table 414, 416, or 418 is marked as being available by updating the MemberId and the MemberName to be NULL values. Moreover, when a member is added to the outline, a RelMemberId is sought for the member. A RelMemberId in a table that is available is used (i.e., a RelMemberId corresponding to a MemberName having a NULL value). When no such RelMemberId is available, a new RelMemberId is generated for the newly added member.

Improving Multi-dimensional Restructure Performance When Adding Or Removing Dimensions and Dimension Members A preferred embodiment of the invention provides a relational storage manager 114 that improves multi-dimensional restructure performance when adding non-anchor dimensions or anchor dimension members and when removing non-anchor dimensions or non-anchor dimension members. In the following examples, the use of "dimension" will refer to a non-anchor dimension, and an anchor dimension will be referred to as "anchor dimension". The preferred embodiment improves performance and reduces the chance of encountering database manager restrictions for some restructuring scenarios, as will be described below.

For a multi-dimensional database, there are several scenarios in which large numbers of members, corresponding to rows in a fact table, are deleted and, therefore, several scenarios in which the associated database problems of slow performance and running out of log space may be encountered. For example, in one scenario, a dimension (sparse or dense) is deleted. In another scenario, several dimension members are deleted.

Figure 5:
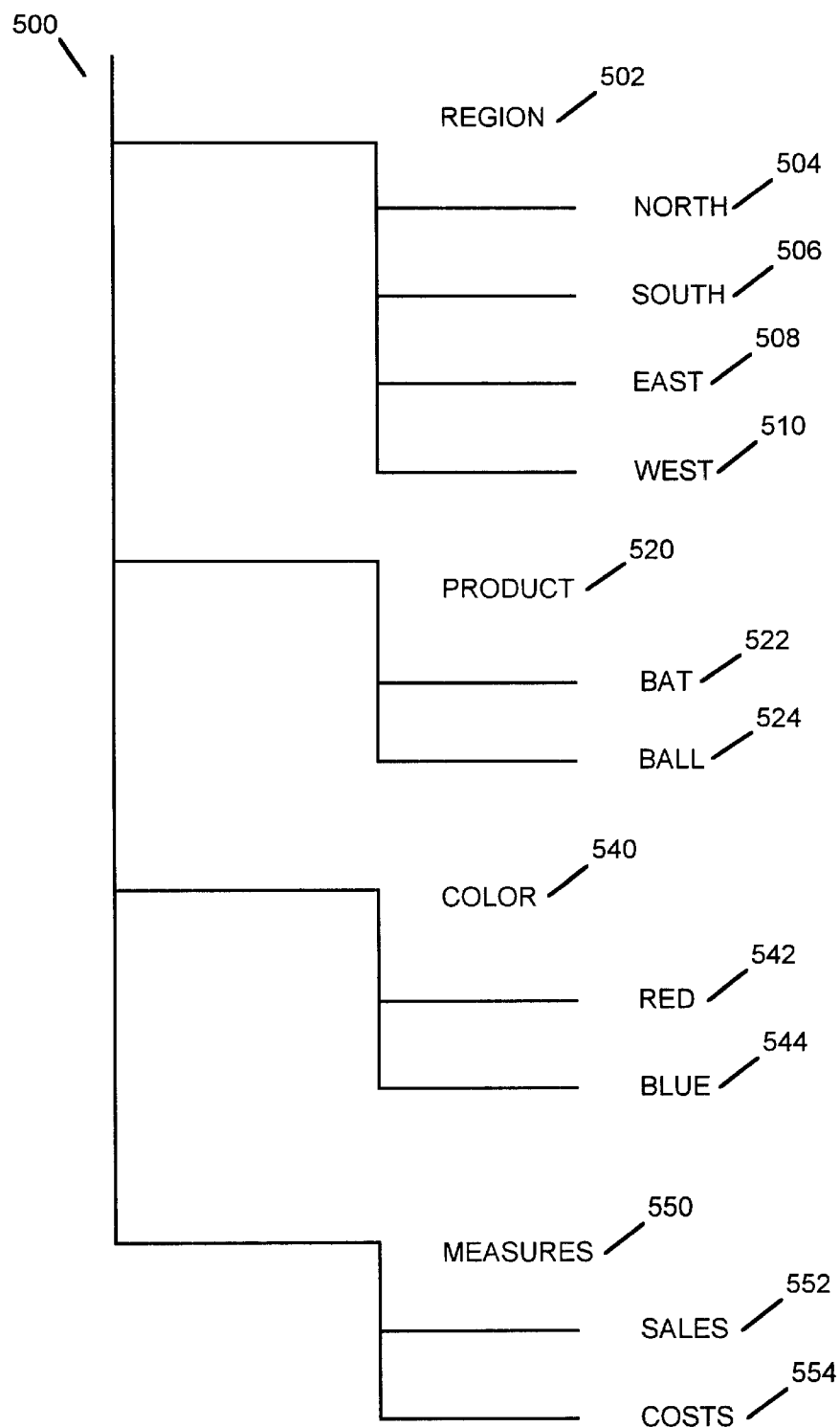
FIG. 5 is a diagram that illustrates a multi-dimensional database outline according to the present invention.

FIG. 5 is a diagram that illustrates a multi-dimensional database outline 500 according to the present invention. The multidimensional database outline 500 includes a region dimension 502, a product dimension 520, a color dimension 540, and a measures dimension 550. The members of the region dimension 502 are: region 502, north 504, south 506, east 508, and west 510. Similarly, the members of the product dimension 520 are: product 520, bat 522, and ball 524. The members of the color dimension 540 are: color 540, red 542, and blue 544. The members of the measures dimension 550 are: measures 550, sales 552 and costs 554.

Table 1 below is a fact table corresponding to the outline of FIG. 5 and will be used for the following discussion.

TABLE 1

| Region | Product | (Time) Unused | Color | Sales | Costs |
| --- | --- | --- | --- | --- | --- |
| N | BAT | TIME | RED | 10 | 5 |
| S | BALL | TIME | BLUE | 6 | 3 |
| S | BAT | TIME | BLUE | 5 | 2.5 |
| W | BALL | TIME | RED | 12 | 6 |
| N | BALL | TIME | RED | 20 | 10 |
| E | BALL | TIME | BLUE | 10 | 5 |
| REGION | BAT | TIME | BLUE | 5 | 2.5 |

In Table 1, there are columns with data for the Region, Product, and Color dimensions. Additionally, the Measures dimension 550 is a non-anchor dimension in this example. Thus, there are columns for the members (Sales 552 and Costs 554) of the anchor dimension Measures 550. Note that Measures is also a member of the Measures dimension 550, but the Measures member does not have a corresponding column in Table 1. In particular, a dimension may be used to represent a rollup (e.g. the sum of sales and costs may be considered profit) or as a collection (e.g., when rollup of dimension members does not make sense). In this example, the Measures dimension 550 will be treated as a collection (i.e., label) that is used to "collect" the sales and costs members. However, one skilled in the art would recognize that the Measures dimension 550 could be treated as a rollup and have a column in Table 1 with data corresponding to, for example, the sum of the sales and costs data. As another example, in the last row of Table 1, region as a parent of all regions is a sum of the other regions (i.e., a rollup).

Also, note that the column for the Time dimension is unused. In this example, the Time dimension was deleted in the outline 500, therefore the corresponding column is unused. In particular, most RDBMSs do not allow columns in a table to be deleted. Therefore, when a dimension is deleted, its corresponding column is retained. Additionally, when a dimension (e.g., Time) is deleted from a multi-dimensional database (e.g., a Cube), the multi-dimensional database has one less dimension (e.g., the Cube becomes a Square). However, the data in the multi-dimensional database originally made sense with respect to the deleted dimension (e.g., sales for red bats in the north region in a particular time period). Therefore, when a dimension is deleted, data associated with one member of the dimension is retained. Typically, the data associated with a "parent" or dimension itself is retained (e.g., data associated with the Time member may be retained). In this example, the data for the member, Time, was retained, and so the values for the Time column are all Time.

Continuing with the example, in one scenario, the region dimension 502 is deleted. When a user deletes a dimension, the user also nominates one dimension member to be kept. As discussed above, the column for region remains in the fact table depicted as Table 1. In this scenario, the relational storage manager 114 deletes all rows in the table except those for the one member in that dimension that the user specifies should be kept. For example, a user indicates that the region dimension 502 should be deleted while keeping the data for the region dimension member 502. Given the task of removing all data except for the region dimension member data, one solution is for the relational storage manager 114 to issue a SQL DELETE statement which removes (i.e., deletes) all rows that do not contain region in the region column (i.e., all rows for north, south, east, and west) and to commit the changes to the database. Referring to Table 1, the last row of the table would be retained, as illustrated in Table 2 below.

TABLE 2

| (Region) Unused | Product | (Time) Unused | Color | Sales | Costs |
|---|---|---|---|---|---|
| REGION | BAT | TIME | BLUE | 5 | 2.5 |

In another scenario, the east and west dimension members are deleted. When a user deletes many members from a dimension, the relational storage manager 114 deletes all rows in the fact table corresponding to these members. Suppose a user deletes the east and west dimension members 506 and 508, then about 40% of the data in the fact table will be deleted (i.e., the data for east and west).

Although this Delete Technique is simple and sometimes works well, when many members are deleted from large tables, the Delete Technique usually has slow performance due to the volume of rows being deleted and due to the CPU and I/O resources required for logging. Another problem with the Delete Technique is that most RDBMSs have some limit on transaction size due to log space limitations. For instance, an RDBMS may limit log file size to 2 gigabytes, and so, if more than 2 gigabytes of log space is required to journal a transaction, the transaction will fail when this log file size limit is exceeded.

The Copy Technique is a solution that avoids the problems of slow performance and reduces the chance of running out of log space. In this solution, the relational storage manager 114 creates a new table that has all of the columns to be retained from the original table and any new columns that are to be added. Then, the relational storage manager 114 specifies that no logging is to be done (if the database manager supports this feature).

For example, a NOT LOGGED INITIALLY clause may be available. The NOT LOGGED INITIALLY clause indicates to the RDBMS 118 that the initial transaction for a table is not to be logged. In particular, if we do not log the initial copy transaction and if the transaction fails, the RDBMS is able to simply reverse the transaction by dropping the table, which does not require use of a log. Various RDBMSs may offer different techniques for limiting logging, which the Copy Technique may be able to exploit. By avoiding logging, the RDBMS 118 provides improved performance, without sacrificing transactional integrity. Thus, the relational storage manager 114 creates the new table with the NOT LOGGED INITIALLY clause. This improves restructure performance by preventing the RDBMS 118 from using I/O or CPU resources for a log file.

If in the Copy Technique, only the region dimension member 502 data is to be kept, the relational storage manager 114 copies the region data from the original table to the new table by using an INSERT statement with a subselect. This type of INSERT enables moves between two tables and avoids the need to retrieve data from an original table, store the data in an application's memory, and move the data from memory into a new table. The relational storage manager 114 commits the changes to the database. Next, the relational storage manager 114 drops the original table. Finally, the relational storage manager renames the new table to the original name.

This approach has several advantages. First, performance may be improved. For example, assume that data is evenly distributed across regions (i.e., region, north, south, east, and west). When all data except that for "region" is deleted from the database using the Delete Technique, 80% of the data is deleted. However, when only the data for "region" is copied, only 20% of the data is copied using the Copy Technique of the present invention. That is, by reducing the amount of data being manipulated, performance is improved. Second, if the copying can be performed without logging, the CPU and I/O resources required is reduced and the problem of the RDBMS log file size limit is avoided.

In another scenario, the east and west dimension members 506 and 508 are deleted. In this case, if the relational storage manager 114 uses the Copy Technique, about 60% of the data (i.e., that for region, north, and south) is copied, and, using the Delete Technique, about 40% of the data is deleted (i.e., that for east and west).

When a dimension is deleted, its corresponding column in the fact table is no longer used. However, a common RDBMS limitation is that columns cannot be removed from relational tables. Therefore, with the Delete Technique, the unused column remains in the table. With the Copy Technique, the CREATE TABLE statement, which creates the new fact table, is constructed such that the new fact table does not contain the unneeded columns. This saves space in the database when the new fact table domes into use and reduces the amount of data manipulated for each row.

Similarly, anchor dimension members (which have corresponding columns in the fact table) can be deleted. When this happens, their corresponding columns are no longer used. With the Copy Technique, the CREATE TABLE statement, which creates the new fact table, can be constructed such that the new fact table does not contain the columns used by the deleted anchor dimension members. This saves space in the database when the new fact table comes into use and reduces the amount of data manipulated for each row.

Figure 6:
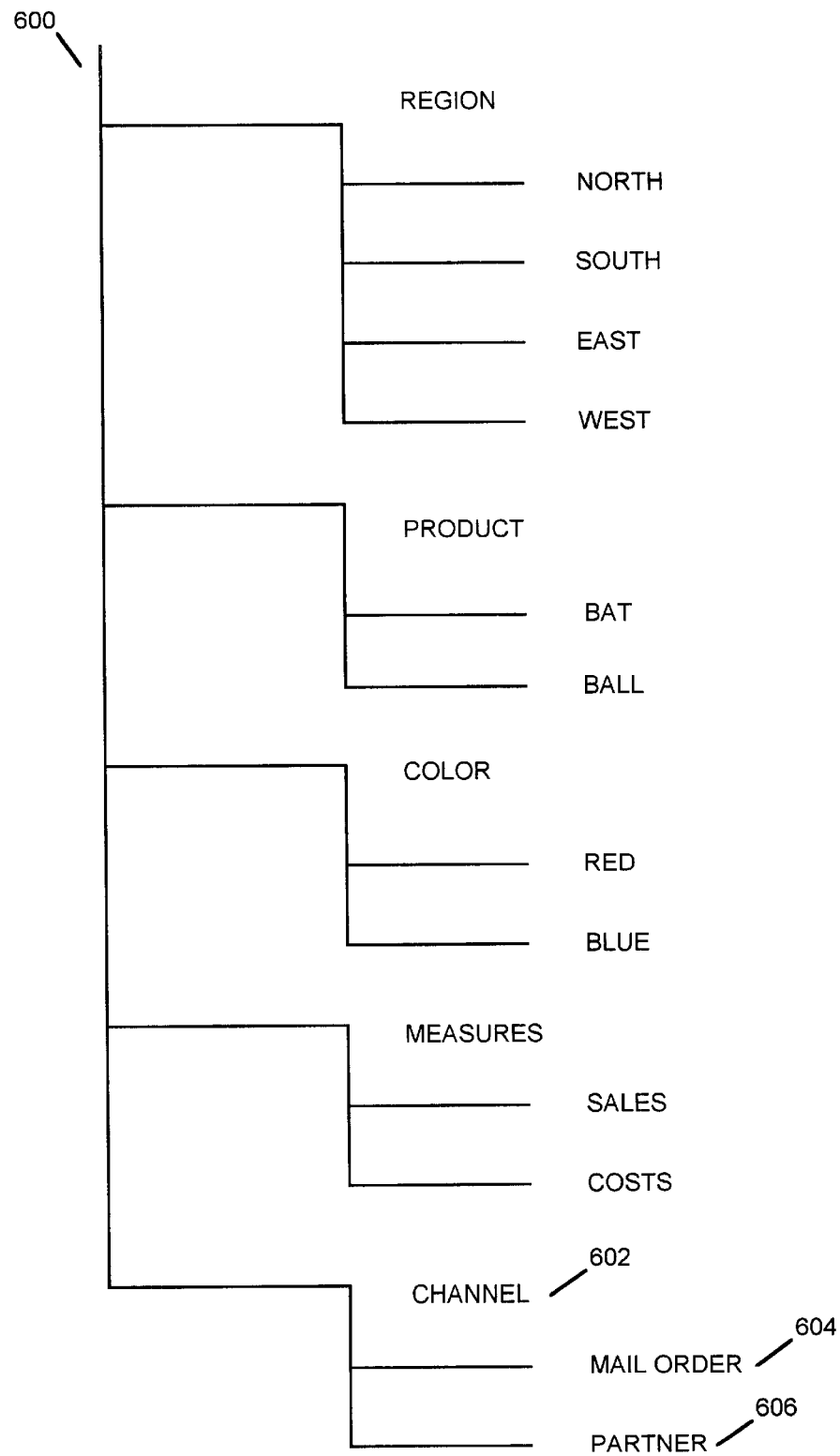
FIG. 6 is a diagram that illustrates a multi-dimensional database outline according to the present invention.

Additionally, when a dimension is added to a multi-dimensional database, a column has to be added to the fact table in the relational database, and a user has to nominate a member for that dimension with which the current data in the cube is associated. FIG. 6 is a diagram that illustrates a multi-dimensional database outline according to the present invention. Outline 600 is similar to outline 500 (FIG. 5) except that another dimension has been added. In particular, a channel dimension 602, with dimension members channel 602, mail order 604, and partner 606, has been added. Once the channel dimension 602 is added, the fact table in the relational database (depicted in Table 3) is modified accordingly.

Similarly, when an anchor dimension member is added, a column has to be added to the fact table in the relational database, and the relational storage manager 114 instructs the RDBMS to initialize all such newly added columns with NULL values. Note that when a member is added to a non-anchor dimension, a new column does not need to be added to the fact table. When data is associated with that member, that will result in rows being added to the fact table.

With the Delete Technique, if a Channel dimension were added, the relational storage manager 114 would add the new column to the fact table and initialize its cells with the identifier representing the nominated member. This results in the manipulation of every row of the fact tables and the associated logging by the RDBMS. Table 3 below is a fact table corresponding to the outline of FIG. 6 when the Delete Technique is used.

TABLE 3

| Region | Product | (Time) Unused | Color | Sales | Costs | Channel |
|---|---|---|---|---|---|---|
| N | BAT | TIME | RED | 10 | 5 | PARTNER |
| S | BALL | TIME | BLUE | 6 | 3 | PARTNER |
| S | BAT | TIME | BLUE | 5 | 2.5 | PARTNER |
| W | BALL | TIME | RED | 12 | 6 | PARTNER |
| N | BALL | TIME | RED | 20 | 10 | PARTNER |
| E | BALL | TIME | BLUE | 10 | 5 | PARTNER |
| REGION | BAT | TIME | BLUE | 5 | 2.5 | PARTNER |

In Table 3, there are columns with data for the Region, Product, Color, and Channel dimensions. The column for the Time dimension is unused but has a nominated member for each row in the table. Additionally, the Measures dimension 550 is an anchor dimension in this example, and so Sales and Costs have columns in the table. The Channel dimension 602 results in a column being added to the table with a nominated member. That is, prior to adding the Channel dimension 602, the data in the multi-dimensional database was associated with one channel, and so, after adding the Channel dimension 602, all of the data in the multi-dimensional database is associated with that channel. For this example, the partner member has been nominated.

With the Copy Technique, if a Channel dimension were added, the relational storage manager 114 adds a column to the new fact table or fact tables and initializes the corresponding column in the fact table(s) with the identifier representing the nominated member. The SELECT INTO statement which populates the new fact table(s) can be constructed such that any column corresponding to a newly added dimension is automatically initialized with the appropriate identifier for the nominated member. Table 4 below is a fact table corresponding to the outline of FIG. 6 when the Copy Technique is used.

TABLE 4

| Region | Product | Color | Sales | Costs | Channel |
|---|---|---|---|---|---|
| N | BAT | RED | 10 | 5 | PARTNER |
| S | BALL | BLUE | 6 | 3 | PARTNER |
| S | BAT | BLUE | 5 | 2.5 | PARTNER |
| W | BALL | RED | 12 | 6 | PARTNER |
| N | BALL | RED | 20 | 10 | PARTNER |
| E | BALL | BLUE | 10 | 5 | PARTNER |
| REGION | BAT | BLUE | 5 | 2.5 | PARTNER |

Table 4 is similar to Table 3, except that the unused column for the Time dimension is not included, thus saving disk space. In addition to saving disk space, otherwise occupied by deleted dimensions and members, the Copy Technique ensures that the relational storage manager 114 doesn't run out of columns due to column-type mismatches. In particular, each RDBMS has some limit on the number of columns that may be defined for a table. Also, RDBMSs don't generally allow the data type of a column to be changed. Since the preferred embodiment of the relational storage manager 114 uses different data types for dimension columns (e.g., 4 byte INTEGERS) and anchor dimension member columns (e.g., 8 byte FLOATING POINT), using the Delete Technique sometimes artificially limits the number of dimensions or anchor dimension members.

For example, if the RDBMS only supports 255 columns per table, a model with five dimension columns and 245 anchor dimension member columns could easily be able to accommodate up to five more dimensions. However, if the 245 anchor dimension member columns resulted from reducing anchor dimension members from 250 to 245, there would be 5 unused columns of the wrong data type, which would prevent adding any dimension columns.

In the Copy Technique, the SQL statement that is generated to copy data from the original table to the new table contains a WHERE clause (i.e., as part of a subselect clause) that excludes data that should not be copied. For example, this clause will indicate that data which corresponds to deleted members should not be copied. Normally this single SQL statement is sufficient to identify exactly what data needs to be copied. However, if a very large number of members are deleted, then the generated SQL statement will exceed the RDBMS maximum SQL statement size. To handle this, the relational storage manager 114 will produce a SQL statement that excludes as much data as possible without exceeding the SQL statement-size limit (i.e., the maximum number of characters that can be included in a SQL statement). Some data that is not wanted will be copied to the new table. After the data is copied to the new table, the relational storage manager 114 removes this extraneous data by using the DELETE SQL statement.

Figure 7:
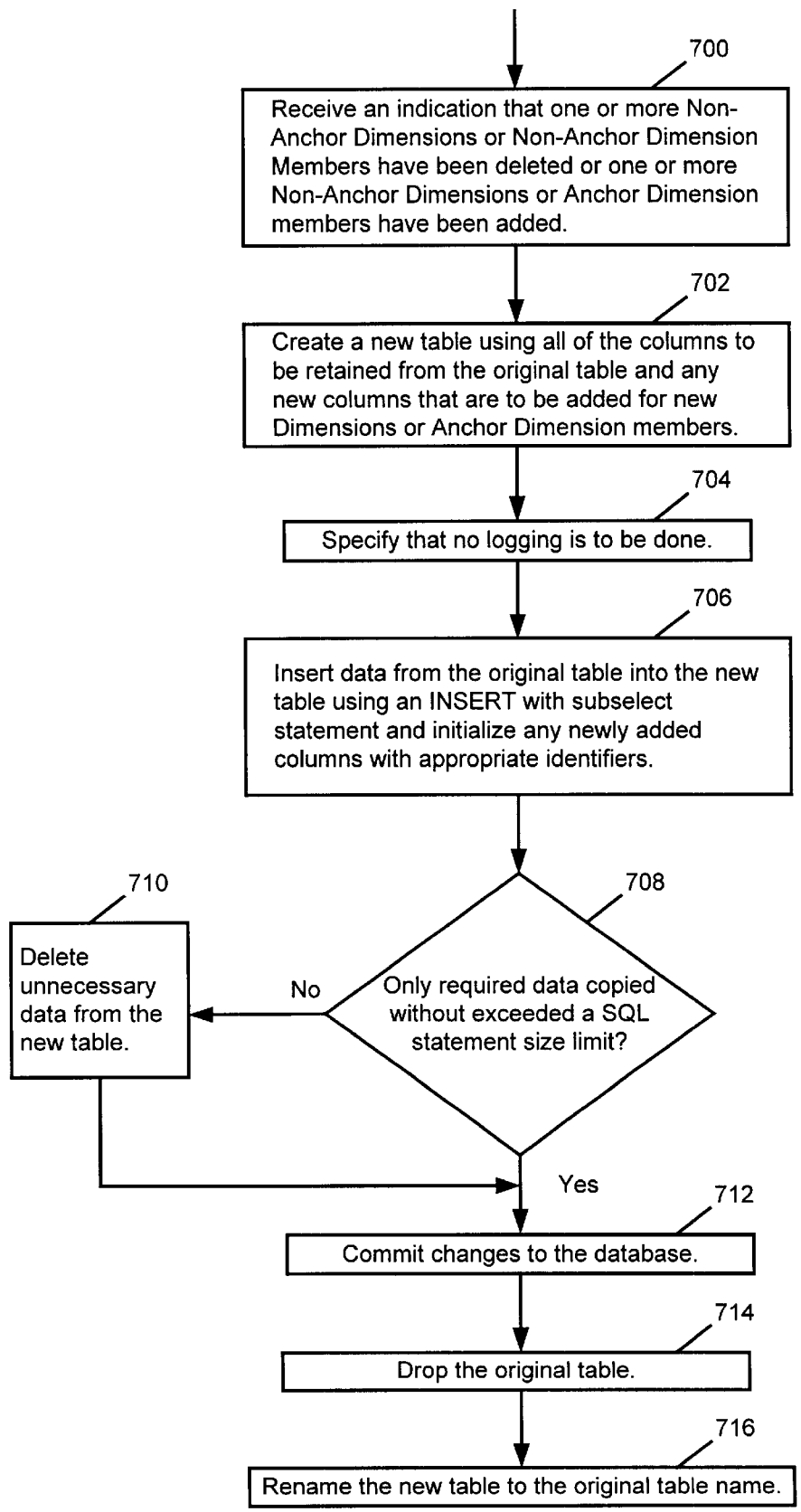
FIG. 7 is a flow diagram illustrating the steps performed by the relational storage manager when using the Copy Technique.

FIG. 7 is a flow diagram illustrating the steps performed by the relational storage manager 114 when using the Copy Technique. In block 700, the relational storage manager 114 receives an indication that one or more non-anchor dimensions or non-anchor dimension members have been deleted or that one or more non-anchor dimensions or anchor dimension members have been added. For example, one non-anchor dimension may be deleted or one non-anchor dimension member may be deleted or one non-anchor dimension may be added or one anchor dimension member may be added or some combination of deletions and additions may occur.

In block 702, the relational storage manager 114 creates a new table using all of the columns to be retained from the original table and any new columns that are to be added for new dimensions and anchor dimension members. That is, columns that are unused (i.e., their corresponding dimensions or dimension members have been deleted) are not included in the new table. Also, the new table includes columns that correspond to added dimensions and anchor dimension members.

In block 704, the relational storage manager 114 specifies that no logging is to be done. Note that in systems in which this option is not available, the relational storage manager 114 does not perform this step. In block 706, the relational storage manager 114 inserts data from the original table into the new table using an INSERT with subselect statement and initializes any newly added columns with appropriate identifiers. In particular, a WHERE clause is used in the INSERT statement to copy rows to the new fact table. When there are multiple fact tables, the execution of the WHERE clause can be performed in parallel against the multiple fact tables, as will be discussed below with reference to FIG. 10. Additionally, the WHERE clause can be combined with other operations (e.g., hashing), which provides additional advantages.

In block 708, the relational storage manager 114 determines whether only required data was copied, without exceeding a SQL statement size limit. If only required data was copied, without exceeding the SQL statement size limit, the relational storage manager 114 continues to block 712, otherwise, the relational storage manager 114 continues to block 710. In block 710, the relational storage manager 114 deletes unnecessary data in the new table. In block 712, the relational storage manager 114 commits the changes to the database. In block 714, the relational storage manager 114 drops the original table. In block 716, the relational storage manager 114 renames the original table to the original table name.

The steps illustrated in blocks 700-714 of FIG. 7 are considered to be one unit of work. Therefore, the commit mentioned in block 710 is an application-level commit. The techniques used to accomplish application-level commits are described in further detail in the above cross-referenced applications entitled: "EXTENSION OF DATA DEFINITION LANGUAGE (DDL) CAPABILITIES FOR RELATIONAL DATABASES FOR APPLICATIONS ISSUING DDL STATEMENTS," filed on Jul. 19, 1999, by Daniel M. DeKimpe et al., Ser. No. 09/356,471; "EXTENSION OF DATA DEFINITION LANGUAGE (DDL) CAPABILITIES FOR RELATIONAL DATABASES FOR APPLICATIONS ISSUING DDL AND DML STATEMENTS," filed on Jul. 19, 1999, by Daniel M. DeKimpe et al., Ser. No. 09/356,059; and "EXTENSION OF DATA DEFINITION LANGUAGE (DDL) CAPABILITIES FOR RELATIONAL DATABASES FOR APPLICATIONS ISSUING MULTIPLE UNITS OF WORK," filed on Jul. 19, 1999, by Daniel M. DeKimpe et al., Ser. No. 09/356,644.

For a particular case, whether the Copy Technique or the Delete Technique is faster depends on what percent of rows are being deleted and which database manager is used. Therefore, the relational storage manager 114 makes a determination as to which of these techniques would be more efficient to use and uses that technique.

In particular, if dimensions or anchor dimension members are being added, the relational storage manager 114 selects the Copy Technique. For these cases, the relational storage manager 114 must access each row of the table to add the nominated identifier for each dimension or to add a NULL value for each anchor dimension member.

Additionally, unused columns associated with dimensions or anchor dimension members may be reused with the Copy Technique. For these cases, the relational storage manager 114 must access each row of the table to add the nominated identifier for the dimension or NULL value for the anchor dimension member.

When non-anchor dimensions or non-anchor dimension members are being deleted, the relational storage manager 114 analyzes the change to the outline and estimates whether it would be faster to delete rows from the current fact table or to create a new fact table and copy the data that is to be retained to the new fact table. The relational storage manager 114 estimates what percentage of rows are being deleted. If the percentage of rows being deleted is below a threshold level, the relational storage manager 114 employs the Delete Technique and deletes the rows from the table. If the threshold is reached, the relational storage manager 114 employs the Copy Technique. In one embodiment of the invention, the threshold has been determined by measuring both approaches to determine when the Copy Technique is more efficient than the Delete Technique, however, one skilled in the art would recognize that the threshold could be set in a different manner.

The relational storage manager 114 estimates how much data will remain in the fact table by first estimating the percent of data being kept for each dimension. If a dimension is deleted, the result is that the data for all members from the dimension are deleted except for the data for the nominated member. In one embodiment, the relational storage manager 114 estimates that the amount of data remaining for one dimension that is deleted will be 1/N, where N represents the number of members in a dimension. For example, the region dimension has five members (i.e., region, north, south, east, and west). If the region dimension is deleted, the relational storage manager 114 estimates that ⅕ of the data will remain in the fact table. The product of the number of members in each deleted dimension is set to R. For example, if one dimension having 5 members and another dimension having 3 members are deleted, R=5 multiplied by 3=15. Then, the amount of data remaining for all of the deleted dimensions is 1/R, which is also referred to as a dimension estimate and which for the example is ⅟15.

If non-anchor dimension members are deleted, then the relational storage manager 114 estimates the data remaining by dividing the number of members that remain by the original number of members. For example, if 3 of 10 members are deleted from a non-anchor dimension, then 7 members remain. This means 70% (7/10) remain.

Next, the relational storage manager 114 multiplies the percent of data being kept for each dimension together. This is done because the deletion of rows are cumulative. If 50% of the members of a dimension are deleted, then only 50% of the original data of the table will be left. But then if 50% of the members of a second dimension are also deleted then only 50% of the remaining data will be left, which means that only 25% of the original data will be left.

The following Table 5 illustrates the calculation being done.

TABLE 5

| Dimension | Members deleted | Original members | Members remaining | Data remaining (%) | Data remaining (ratio) |
|---|---|---|---|---|---|
| 1 | 2 | 10 | 8 | 8/10 = 80% | 0.80 |
| 2 | 0 | 10 | 10 | 10/10 = 100% | 1.00 |
| 3 | 4 | 10 | 6 | 6/10 = 60% | 0.60 |
| 4 | 0 | 10 | 10 | 10/10 = 100% | 1.00 |

If two members of dimension 1 and 4 members of dimension 3 are deleted, the data remaining in the table= 0.80 * 1.00 * 0.60 * 1.00=0.48 (i.e., 48% of the original data).

Additionally, the relational storage manager 114 makes a determination of whether to use the Copy or Delete Techniques by considering the number of unused columns in the table. For example, if there are many unused columns, the relational storage manager 114 determines that it would be better to use the Copy Technique because the new table will not include the unused columns, thus saving space and reduces the amount of data manipulated by the RDBMS in subsequent table operations. If there are not many unused columns in the table, the relational storage manager 114 determines that the Delete Technique may be used.

Figure 8A:
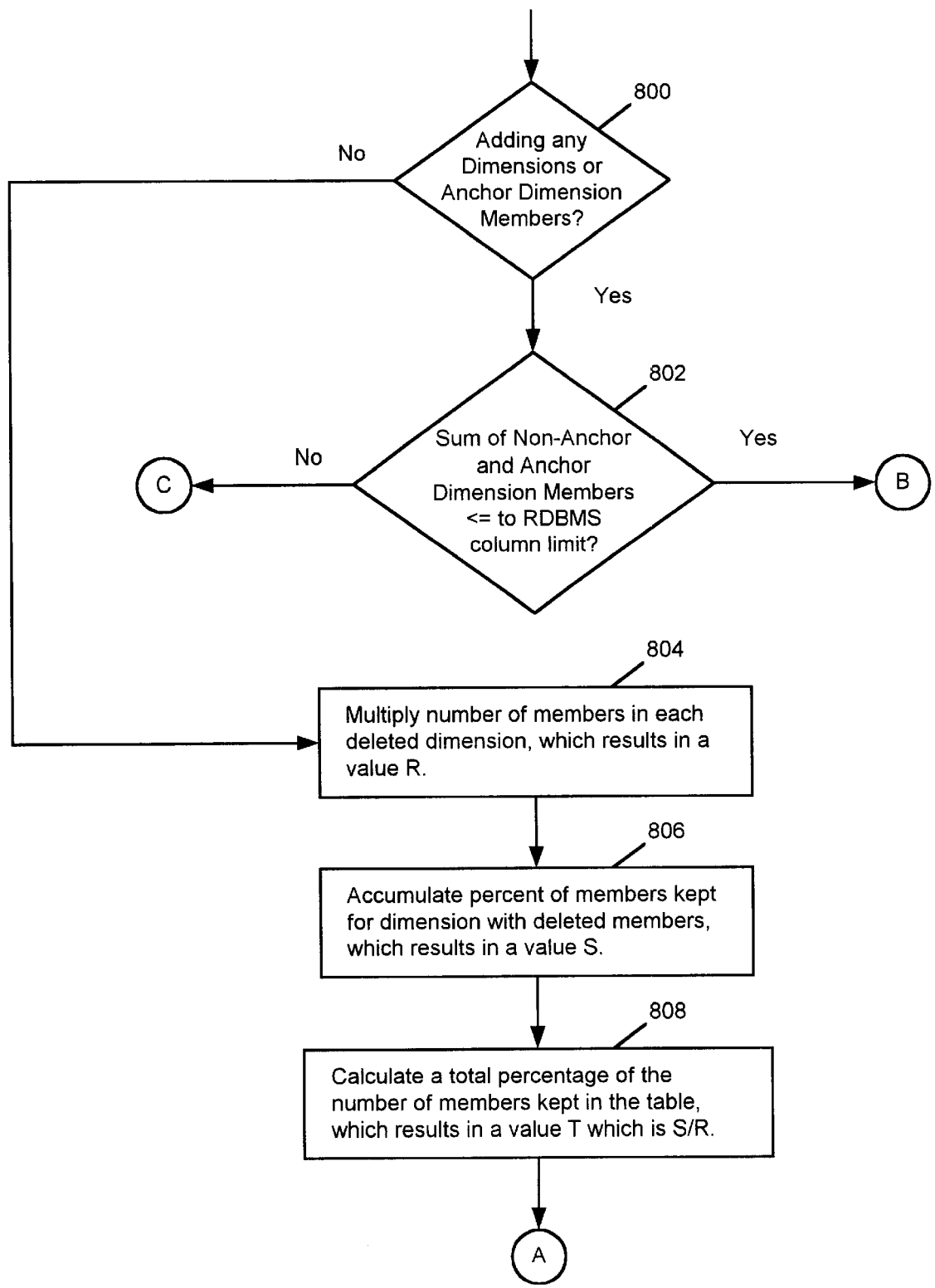
FIGS. 8A and 8B are flow diagrams illustrating the steps performed by the relational storage manager when determining whether to use the Copy Technique or the Delete Technique.
Figure 8B:
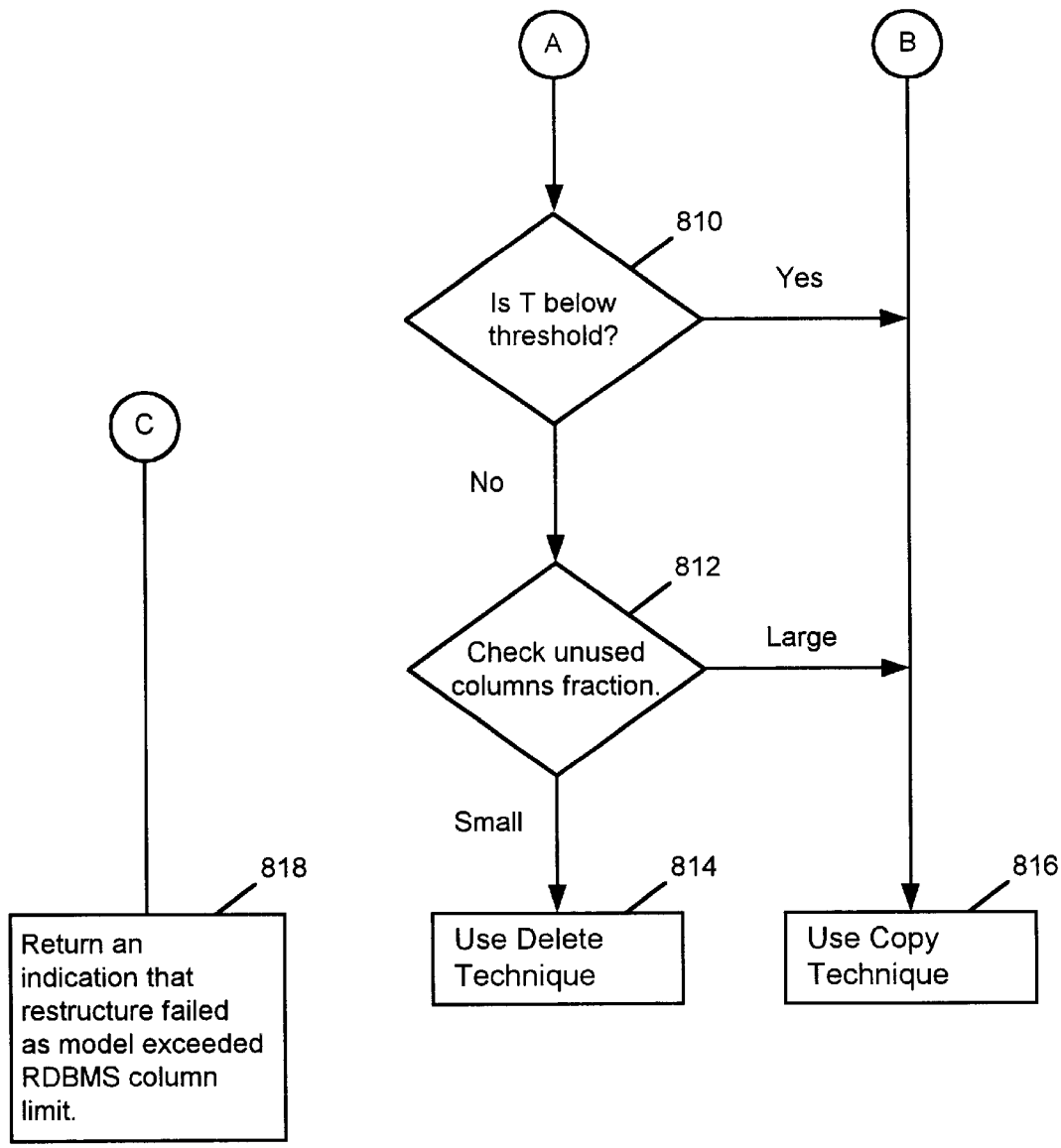

FIGS. 8A and 8B are flow diagrams illustrating the steps performed by the relational storage manager 114 when determining whether to use the Copy Technique or the Delete Technique. In block 800, the relational storage manager 114 determines whether any dimensions or anchor dimension members have been added. If so, the relational storage manager 114 continues to block 802, otherwise, the relational storage manager 114 continues to block 804.

In block 802, the relational storage manager 114 determines whether the sum of non-anchor and anchor dimension members is less than or equal to a RDBMS column limit. If so, the relational storage manager 114 continues to Block 816 and uses the Copy Technique, otherwise, the relational storage manager 114 continues to Block 818 and returns an indication that restructure has failed. In particular, if dimensions or anchor dimension members have been added, the relational storage manager 114 adds a new column to the fact table and initializes the column values to NULL in each row for the added column. As initializing the column values to NULL requires accessing each row of the table, the relational storage manager 114 determines that the Copy Technique is more efficient than the Delete Technique. However, if the number of columns required for a new table exceeds the RDBMS column limit, the new table cannot be created, and the restructure (i.e., the addition of dimensions or anchor dimension members) to the multi-dimensional database fails.

Continuing with the flow diagram, in blocks 804–810, the relational storage manager 114 estimates the amount of data that remains when one or more non-anchor dimension or dimension members are deleted. In block 804, the relational storage manager 114 multiplies the number of members in each deleted dimension, which results in a value R. For example, if the region dimension (having 5 members) and the product dimension (having 3 members) were deleted, R=5 multiplied by 3=15 (i.e., R=3×5=15).

In block 806, the relational storage manager 114 accumulates a percent of members kept for each dimension with deleted members, which results in a value S, which is also referred to as a dimension member estimate. That is, S is the product of the percentage of members kept for each dimension in which members have been deleted. The anchor dimension members are not included as they affect columns and do not affect whether the number of rows will change. In block 808, a total percentage of the number of members kept in the table is calculated, resulting in a value T. T is equivalent to S divided by R (i.e., S/R).

In block 810, the relational storage manager 114 determines whether T is below a threshold. If T is below a threshold, the relational storage manager 114 continues to block 816 and uses the Copy Technique, otherwise, the relational storage manager 114 continues to block 812.

In block 812, the relational storage manager 114 checks the unused columns fraction. If the fraction is large, the relational storage manager 114 continues to block 818 and uses the Copy Technique. If the fraction is small, the relational storage manager 114 continues to block 814 and uses the Delete Technique. One skilled in the art would recognize that the large and small values may be determined with different techniques. For example, the fraction may be selected by a user, may be based on prior access patterns, etc. The fraction depends on how much the multidimensional database will be used before the next restructure.

Although the above examples have referred to a single table, the technique of the present invention can be applied to multiple tables. In particular, if the multi-dimensional database has multiple fact tables, then multiple threads (one per table) and multiple connections (one per table) are used to create and fill the new tables.

As discussed above with respect to FIG. 4, in one embodiment of the invention, the star schema comprises N fact tables joined to multiple dimension tables. Each fact table contains the data for multiple data blocks. Additionally, a key table contains information about the data blocks. In particular, the information includes status information (e.g., usage information), timestamps (e.g., age information), and a block key (i.e., the sparse index key comprised of Member Ids). When a new multi-dimensional database is created, the relational storage manager 114 creates the N fact tables of the star schema. By creating N fact tables, the relational storage manager 114 is able to perform operations in parallel across the N fact tables and the separate key table, leading to more efficient database processing. In particular, the relational storage manager 114 with the Copy Technique is able to create new fact tables and copy data into them in parallel using separate threads. In an alternative embodiment, the star schema may be comprised of one fact table, dimension tables, and a key table. In this scenario, the fact table and key table may be accessed in parallel, leading to more efficient processing.

In particular, the relational storage manager 114 uses concurrent threads with separate database connections when performing input/output (I/O) operations (e.g., INSERT). The applications (e.g., the OLAP client program 106) submit different requests, each on a separate thread. Initially, the relational storage manager 114 generates a single thread with a single connection to the relational database for each session started by the OLAP engine 112. The OLAP engine 112 starts a session for each application that submits requests to the OLAP engine 112. For example, if four applications submit requests to the OLAP engine 112, then the relational storage manager 114 generates four separate threads, each with a different connection.

Initially, if the relational storage manager receives a request that requires only reading data, the relational storage manager 114 uses the single thread to read the data in the fact tables and the key table. When the relational storage manager 114 receives a request that requires writing data, the relational storage manager 114 generates multiple threads, one for each fact table and key table, with multiple connections, one for each fact table and key table.

A connection is a relational database concept that refers to enabling an application to submit requests to the relational database. A thread is an operating system concept in which a part of a program can execute independently from other parts. Operating systems that support multithreading enable programmers to design programs whose threaded parts can execute concurrently.

In order to provide concurrent operations, the relational storage manager 114 uses N independent threads to access the N fact tables and another thread to access the key table. Each thread maintains an RDBMS connection with exactly one of the tables (i.e., the fact tables and key table). This allows the relational storage manager 114 to write multiple blocks concurrently.

The relational storage manager 114 uses a hashing function (i.e., a partitioning function) based on dimension identifiers to determine the fact table in which rows are to be stored. In this invention, the hashing function is added to the WHERE clause of the INSERT statement used to copy rows to the new fact tables.

Figure 9:
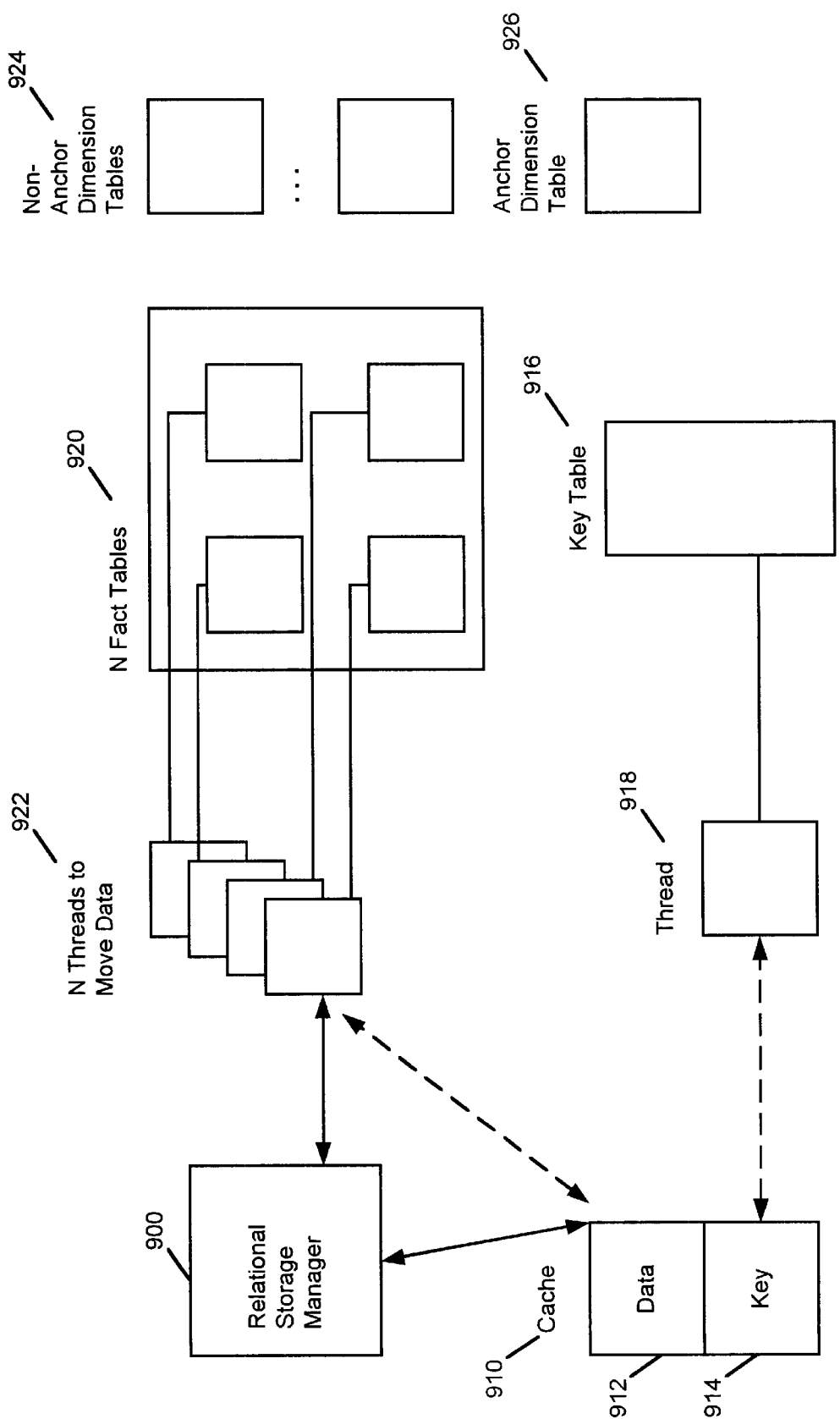
FIG. 9 is a block diagram illustrating improved performance of table insertion by using multiple tables or multiple threads.

FIG. 9 is a block diagram illustrating table insertion by using multiple tables or multiple threads. In the following example, the OLAP client 106 writing (i.e., copying or inserting) data into the fact tables 920. As shown in FIG. 9, the relational storage manager 900 maintains a cache 910 in memory. Additionally, fact tables 920, non-anchor dimension tables 924, anchor dimension table 926, and key table 916 are stored in persistent storage.

When data is to be written, initially, a data block and its sparse index key are presented to the relational storage manager 900 by a multi-dimensional database calculation engine (MDCE) (which is part of the OLAP engine 112) for writing to persistent storage. The MDCE accesses a single data block at a time for a transaction, with a data block corresponding to data in one fact table. Note that the MDCE actually receives multiple requests from different applications. The MDCE uses a separate thread for each request when communicating with the relational storage manager 900. However, when the MDCE requests data for an application, the MDCE pauses processing for that application until the data is received. After receiving a request from the MDCE, the relational storage manager 900 copies the requested data to a memory-resident cache 910 and returns control to the MDCE.

The cache 910 holds fact table data 912 and key table information 914. The data 912 includes data retrieved from the fact tables 920 in response to a request for data from the OLAP client 106, and this data is returned by the relational storage manager 900 to the OLAP engine 112, which returns the data to the OLAP client 106. Additionally, the data 912 may include data to be written to the fact tables 920.

The key table information 914 includes entries, with each entry containing status information (e.g., usage information), timestamps (e.g., age information), and a block key (i.e., the sparse index key comprised of Member Ids). The block key is a sparse index key, which comprises a combination of one MemberId for each sparse dimension used internally in Hyperion Software's Essbase OLAP software.

After the MDCE submits a request to commit data (i.e., to copy data from the cache to the relational database), or when a predetermined amount of data for the fact tables has been written to the cache (i.e., there are "dirty" or modified data blocks in the cache), a group of data blocks is selected to be written to the fact tables 920. A hashing function is used to determine which rows corresponding to the data blocks are to be in which of the N fact tables. The set of sparse dimension identifiers (i.e., MemberIds) used in a hashing function can be derived from the sparse index key that identifies a data block. The hashing function maps the MemberIds of the sparse index key to RelMemberIds, adds the RelMemberIds, and mods by N. This allows each of the N threads 922 that move data to and from the fact tables 920 to determine which rows it is responsible for writing to its corresponding fact table 920. Additionally, the thread 918 is used to manipulate key table 916 entries corresponding to the rows in parallel with the N threads 922. Thus data is written into the relational database concurrently using N threads 922 and thread 918.

That is, when the MDCE specifies that a transaction is to be committed, all cache data that has not been written to one of the fact tables 920 is then written to the appropriate fact tables 920 the key table 916, and the RDBMS 118 is instructed to commit all data it has received. Similarly, when there are a predetermined number of "dirty" data blocks in the cache, they are written to the appropriate fact tables 920 and the key table 916.

This allocation of multiple threads, each having a separate database connection, for each fact table and the key table ensures that the fact tables and the key table of the relational storage manager 900 star schema can be modified concurrently without causing RDBMS 118 deadlocks.

The relational storage manager may create N new fact tables and copy the data in the original fact tables among the new fact tables. The relational storage manager does this using N concurrent threads and connections and one for each new fact table.

Figure 10:
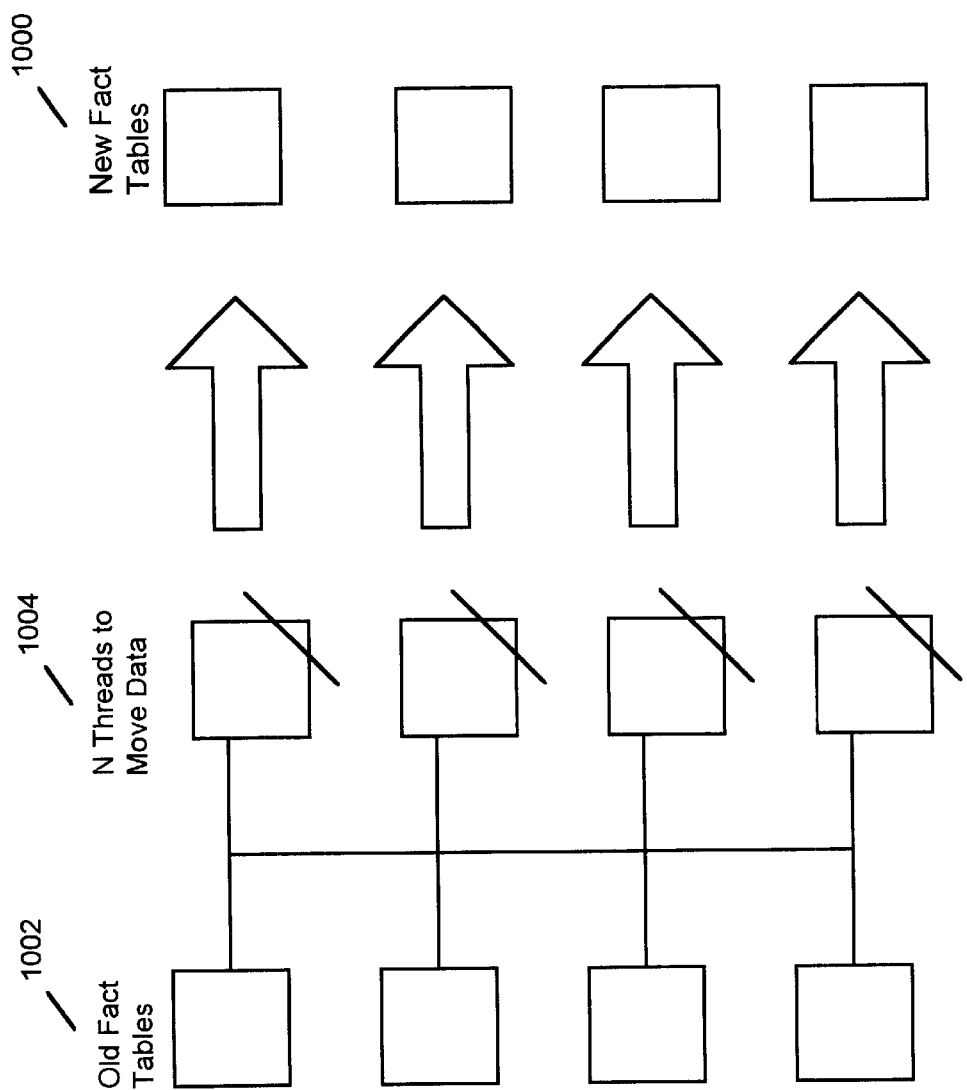
FIG. 10 is a block diagram illustrating the relational storage manager using N threads to redistribute data among N fact tables.

FIG. 10 is a block diagram illustrating the relational storage manager 114 using N threads to redistribute data among N fact tables. The relational storage manager 114 creates N new fact tables 1000 and then copies the data of the original fact tables 1002 into the new fact tables 1000. In particular, the relational storage manager starts N threads 1004 concurrently to perform the redistribution. Each of the N threads 1004 stores data into one new fact table 1000. Also, each of the threads may retrieve data from each of the fact tables 1002. In particular, each thread recognizes the rows that should be stored into its corresponding new fact table 1000. Therefore, each thread 1004 retrieves these rows from the original fact tables 1002 for storage into the corresponding new fact table 1000.

In one embodiment, the data is moved using an INSERT with a subselect clause. This type of INSERT enables moves between two tables and avoids the need to retrieve data from an original fact table, store the data in an application's memory, and move the data from memory into a new fact table. Then, each of the N threads performs N INSERT statements with a subselect clause against each of the original fact tables. The subselect clause retrieves the appropriate rows from each of the original fact tables; while the INSERT inserts these rows into the new fact table corresponding to that thread.

When the Copy Technique is used, the subselect clauses can be combined so that redistribution, deletion, and addition can be accomplished with one set of INSERT statements performed in parallel.

Finally, if there are multiple fact tables, rows may need to be rearranged within the fact tables using a hashing technique to determine which fact table a particular row belongs to. If this is the case, rows can be moved from one original fact table to the appropriate new fact table by building an expression which represents the hashing technique in the WHERE clause of the SELECT INTO statement used to move rows from the original fact tables to the new.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a command in a computer to perform a database operation on a relational database stored on a data store connected to the computer and associated with a multi-dimensional database, comprising:

determining that said multi-dimensional database has been modified;

determining that the modified multi-dimensional database requires modifications to one or more original tables in the relational database corresponding to the multi-dimensional database; and incorporating the modifications into one or more new tables by selectively copying data from the one or more original tables into the one or more new tables.

2. The method of claim 1, wherein determining that a multi-dimensional database has been modified comprises determining that one or more non-anchor dimensions or non-anchor dimension members have been deleted.

3. The method of claim 1, wherein determining that a multi-dimensional database has been modified comprises determining that one or more non-anchor dimensions or anchor dimension members have been added.

4. The method of claim 1, wherein copying further comprises creating the one or more new tables using all of the columns to be retained from the original table and any new columns that are to be added for new dimension and anchor dimension members.

5. The method of claim 1, wherein copying further comprises eliminating logging on an initial transaction.

6. The method of claim 1, wherein copying further comprises inserting data into the new table from the original table using an insert with subselect statement.

7. The method of claim 6, wherein the subselect statement comprises a where clause.

8. The method of claim 1, wherein copying further comprises initializing a column newly added or being reused to the original table with a NULL value in the new table.

9. The method of claim 1, further comprising deleting unnecessary data from the new table.

10. The method of claim 1, further comprising dropping the original table.

11. The method of claim 1, further comprising renaming the new table to the original table name.

12. The method of claim 1, wherein there are multiple original tables and multiple new tables, further comprising concurrently copying date from each of the original tables into each of the new tables with separate threads.

13. The method of claim 12, wherein each thread maintains a separate database connection.

14. The method of claim 12, further comprising identifying which data goes into which table using a hashing function based on a set of dimension identifiers that identify dimensions in the multi-dimensional database.

15. The method of claim 14, wherein copying further comprises moving data from the original tables into the new tables using an insert statement with a subselect clause that specifies the hashing function.

16. An apparatus for executing a command in a computer, comprising:

a computer having a data store coupled thereto, wherein the data store stores a relational database;

one or more computer programs, performed by the computer, for determining that a multi-dimensional database has been modified, determining that the modified multi-dimensional database requires modifications to one or more original tables in a relational database corresponding to the multi-dimensional database, and incorporating the modifications into one or more new tables by copying data from the one or more original tables into the one or more new tables.

17. The apparatus of claim 16, wherein determining that a multi-dimensional database has been modified comprises determining that one or more non-anchor dimensions or non-anchor dimension members have been deleted.

18. The apparatus of claim 16, wherein determining that a multi-dimensional database has been modified comprises determining that one or more non-anchor dimensions or anchor dimension members have been added.

19. The apparatus of claim 16, wherein copying further comprises creating the one or more new tables using all of the columns to be retained from the original table and any new columns that are to be added for new dimensions and anchor dimension members.

20. The apparatus of claim 16, wherein copying further comprises eliminating logging on an initial transaction.

21. The apparatus of claim 16, wherein copying further comprises inserting data into the new table from the original table using an insert with subselect statement.

22. The apparatus of claim 21, wherein the subselect statement comprises a where clause.

23. The apparatus of claim 16, wherein copying further comprises initializing a column newly added or being reused to the original table with an appropriate identifier in the new table.

24. The apparatus of claim 16, further comprising deleting unnecessary data from the new table.

25. The apparatus of claim 16, further comprising dropping the original table.

26. The apparatus of claim 16, further comprising renaming the new table to the original table name.

27. The apparatus of claim 16, wherein there are multiple original tables and multiple new cables, further comprising concurrently copying data from each of the original tables into each of the new tables with separate threads.

28. The apparatus of claim 27, wherein each thread maintains a separate database connection.

29. The apparatus of claim 27, further comprising identifying which data goes into which table using a hashing function based on a set of dimension identifiers that identify dimensions in the multi-dimensional database.

30. The apparatus of claim 29, wherein copying further comprises moving data from the original tables into the new tables using an insert statement with a subselect clause that specifies the hashing function.

31. An article of manufacture including a program storage medium readable by a computer and embodying one or more instructions executable by the computer to perform method steps for executing a command to perform a database operation on a relational database stored on a data store connected to the computer, comprising:

determining that a multi-dimensional database has been modified;

determining that the modified multi-dimensional database requires modifications to one or more original tables in a relational database corresponding to the multi-dimensional database; and incorporating the modifications into one or more new tables by copying data from the one or more original tables into the one or more new tables.

32. The article of manufacture of claim 31, wherein determining that a multi-dimensional database has been modified comprises determining that one or more non-anchor dimensions or non-anchor dimension members have been deleted.

33. The article of manufacture of claim 31, wherein determining that a multi-dimensional databases has been modified comprises determining that one or more non-anchor dimensions or anchor dimension members have been added.

34. The article of manufacture of claim 31, wherein copying further comprises creating the one or more new tables using all of the columns to be retained from the original table and any new columns that are to be added for new dimensions and anchor dimension members.

35. The article of manufacture of claim 31, wherein copying further comprises eliminating logging on an initial transaction.

36. The article of manufacture of claim 31, wherein copying further comprises inserting data into the new table from the original table using an insert with subselect statement.

37. The article of manufacture of claim 36, wherein subselect statement comprises a where clause.

38. The article of manufacture of claim 31, wherein copying further comprises initializing a column newly added or being reused to the original table with an appropriate identifier in the new table.

39. The article of manufacture of claim 31, further comprising deleting unnecessary data from the new table.

40. The article of manufacture of claim 31, further comprising dropping the original table.

41. The article of manufacture of claim 31, further comprising renaming the new table to the original table name.

42. The article of manufacture of claim 31, wherein there are multiple original tables and multiple new tables, further comprising concurrently copying data from each of the original tables into each of the new tables with separate threads.

43. The article of manufacture of claim 42, wherein each thread maintains a separate database connection.

44. The article of manufacture of claim 42, further comprising identifying which data goes into which table using a hashing function based on a set of dimension identifiers that identify dimensions in the multi-dimensional database.

45. The article of manufacture of claim 44, wherein copying further comprises moving data from the original tables into the new tables using an insert statement with a subselect clause that specifies the hashing function.

* * * * *